United States Patent Office 3,531,426
Patented Sept. 29, 1970

3,531,426
ASPHALTS CONTAINING COPOLYMERS OF OLEFIN HYDROCARBONS AND MALEIC DERIVATIVES AS DUCTILITY IMPROVERS
Joosup Shim, Wenonah, and Paul Y. C. Gee, Woodbury, N.J., assignors to Mobil Oil Corporation, a corporation of New York
No Drawing. Filed Dec. 6, 1967, Ser. No. 688,368
Int. Cl. C08f 45/52
U.S. Cl. 260—28.5
5 Claims

ABSTRACT OF THE DISCLOSURE

Improved asphaltic compositions are provided which contain, in an amount sufficient to improve the ductility of such compositions, a polymeric material selected from the group consisting of copolymers of a hydrocarbon having an olefin linkage and an alkyl maleate, and an alkyl ester of a copolymer of such hydrocarbons and maleic anhydride.

BACKGROUND OF THE INVENTION

Field of the invention

This invention relates to improved asphaltic compositions, and in one of its aspects relates to asphaltic compositions having improved ductility properties. More particularly in this aspect, the invention relates to asphaltic compositions containing certain additives which are effective in functioning as ductility improvers, which are particularly effective in rendering the asphaltic material advantageous for use in such fields as road paving.

Description of the prior art

Prior to the present invention, attempts have been made to improve the ductility of asphaltic materials for such purposes as road paving and other applications in which the ductility of the asphalt is an important requisite. In this regard, such improvement in ductility has been attempted through the use of various types of antioxidant materials. The latter, however, have not provided sufficiently satisfactory results.

SUMMARY OF THE INVENTION

It has now been found, as more fully hereinafter described, that asphaltic compositions can be provided possessing improved ductility characteristics, by incorporating therein relatively small amounts of polymeric materials selected from the group consisting of copolymers of a hydrocarbon having an olefin linkage and an alkyl maleate, and an alkyl ester of a copolymer of such hydrocarbons and maleic anhydride. In accordance with the invention, these polymeric materials can be effectively employed in the asphaltic composition, as ductility improvers, in an amount of at least about 0.1 percent, by weight, of the total weight of the composition. In most practical applications the polymeric material is employed in an amount from about 0.1 percent to about 10 percent, and preferably from about 1 percent to about 5 percent, by weight, of the total weight of the composition. Preferred copolymers are those which comprise a styrene-alkyl maleate copolymer in which the alkyl portion of the alkyl maleate contains from about 4 to about 24 carbon atoms; or alkyl esters of a copolymer of an olefin and maleic anhydride, in which the olefin contains from about 8 to about 24 carbon atoms and the alkyl portion of the alkyl ester contains from about 4 to about 24 carbon atoms.

The asphaltic compositions improved in accordance with the present invention may comprise any asphaltic material in which improvement in ductility is desirable. A field of specific applicability is in the improvement of asphalts and asphaltic compositions employed for such purposes as road paving. Of particular importance is the improvement of road paving asphalts having penetrations at 77/100/5 from about 40 to about 300, and preferably from about 85 to about 100. In this respect, it will be understood that the asphaltic compositions improved in accordance with the present invention may comprise such materials as asphaltic tars, pitches, bitumins and the like, in which ductility improvement is an important feature.

As previously described, the ductility improvers of the present invention comprise copolymers of a hydrocarbon having an olefin linkage and an alkyl maleate, or an alkyl ester of a copolymer of such hydrocarbon and maleic anhydride. In general, the olefin-alkyl maleate copolymer, e.g. a styrene-alkyl maleate copolymer, is prepared by heating from ½ to 2 moles of styrene with 1 mole of the alkyl maleate at a temperature from about 75° C. to about 175° C. in the presence of a small amount (e.g. 1 to 10% by weight) of a polymerization catalyst such as benzoyl peroxide, di-t-butyl peroxide or 2,2′-azobis (2-methyl propionitrile). The alkyl esters of the olefin-maleate anhydride copolymers are prepared, in general, by first heating from ½ to 2 moles of the olefin with 1 mole of maleic anhydride at a temperature from about 75° C. to about 175° C. in the presence of a small amount (e.g. 1 to 10% by weight) of a polymerization catalyst, such as those indicated above, to form the olefin-maleic anhydride copolymer. The copolymer thus produced is then esterified with 1 or 2 moles of the selected alcohol to form the final copolymeric product, viz the ester of the olefin-maleic anhydride copolymer. The alcohols employed in the preparation of the aforementioned copolymers may be primary, secondary, straight-chain or branched-chain. Preferably, these alcohols are those having from about 4 to about 24 carbon atoms. The olefins employed for the preparation of the olefin-maleic anhydride copolymers are preferably 1-olefins having from about 8 to about 24 carbon atoms.

DESCRIPTION OF SPECIFIC EMBODIMENTS

The following data and examples will serve to illustrate the preparation of the copolymers of the present invention and their efficacy for improving the ductility characteristics of asphaltic compositions. It will be understood, however, that it is not intended the invention be limited to the particular copolymers, or the particular asphaltic compositions containing these copolymers, as described. Various modifications of these compositions, as previously indicated, can be employed and will be readily apparent to those skilled in the art.

EXAMPLE 1

A mixture of 34.7 grams (⅓ mole) of styrene, 155.3 grams (⅓ mole) of di-Dytol J-68 maleate and 1.9 grams (1%) of di-t-butyl peroxide was gradually heated to a temperature of 150° C. with stirring. After the resulting mixture had been stirred at a temperature maintained between 150° C. and about 157° C. for a period of 6 hours, an additional amount of 1.9 grams (1%) di-t-butyl perioxide was added at a temperature of 50° C. After the resulting mixture had been stirred at a temperature from about 150° C. to about 157° C. for another period of 6 hours, a further amount of 1.9 grams (1%) of di-t-butyl peroxide was added at a temperature of 50° C. After this mixture had been stirred at a temperature from about 150° C. to about 155° C. for a further 6 hours, a further amount of 1.9 grams (1%) of di-t-butyl peroxide was added at a temperature of 50° C. After the mixture had been stirred at a temperature from about 150° C. to about 157° C. for a further period of 2 hours, the resulting reaction product became quite viscous and the reaction was immediately discontinued. The final product, viz the styrene di-Dytol J–68 maleate copolymer, was clear and very viscous at room temperature.

The aforementioned di-Dytol J–68 maleate, employed for the preparation of the above-described copolymer, was prepared by heating 1 mole of maleic anhydride with 2 moles of Dytol J–68 alcohol. The Dytol J–68 alcohol, is manufactured by Rohm & Haas Co. and comprises a mixture containing 0.4% n-primary decanol, 81.5% n-primary dodecanol, 17.8% n-primary tetradecanol and 0.3% n-primary hexadecanol.

EXAMPLE 2

A copolymer of a $C_{15}$–$C_{20}$ (mixed) 1-olefin-maleic anhydride was prepared by heating 60.5 grams (0.25 mole) of $C_{15}$–$C_{20}$ (mixed) 1-olefins with 24.5 grams (0.25 mole) of maleic anhydride in the presence of 3.4 grams (4%) of benzoyl peroxide as a catalyst. This copolymer was then esterified with 96.5 grams (0.5 mole) of Dytol J–68 alcohol, 1.8 grams (1%) of p-toluene sulphonic acid and 75 cc. of xylene by gradual heating to 175° C., and was held at this temperature until water stopped coming over. The quantity of water collected was 4.5 cc., theory 4.5 cc. The resulting reaction product was then water-washed and topped to a temperature of 200° C. at 3.5 mm. pressure. The final product, viz the di-Dytol J–68 ester of $C_{15}$–$C_{20}$ (mixed) 1-olefin-maleic anhydride was found to be clear and viscous at room temperature.

The effectiveness of incorporating the aforementioned copolymeric materials as ductility improvers in asphaltic compositions, is demonstrated in the following Table II by the ductility data obtained in accordance with ASTM test D113–5, obtained after a 1/16" thin-film oven test, carried out in accordance with ASTM D01754–1, in which the copolymers were blended in a road-paving asphalt having the properties shown in Table I.

TABLE I.—PROPERTIES OF ROADPAVING ASPHALT

| | |
|---|---|
| Specific gravity | 1.0286 |
| Softening point ° F | 114.8 |
| Penetration, 77/100/5 | 89 |
| Penetration, 32/300/60 | 29 |
| Ductility at 77° F cm | 140+ |
| Flash COC ° F | 615 |
| Kinematic viscosity, cs.: | |
|   At 158° F | 447 |
|   At 275° F | 403 |
|   At 300° F | 191 |

TABLE II.—THIN FILM OVEN DUCTILITY TEST (ASTM D01754-1)

| Inhibitor | Concentration (percent by wt.) | Ductility (ASTM D-113-5) (at 77° F.) (cm.) |
|---|---|---|
| Uninhibited asphalt | 0 | 40 |
| Uninhibited asphalt plus Ex. 1 | 1.0 | 56 |
| Uninhibited asphalt plus Ex. 1 | 2.0 | 104 |
| Uninhibited asphalt plus Ex. 2 | 2.0 | 60 |

As will be apparent from the foregoing data, the untreated asphalt exhibited a ductility rating of 140+ cm. at 77° F., as shown in Table I, in accordance with ASTM test D113–5. This uninhibited asphalt, when subjected to a thin-film oven test, in accordance with ASTM test D01754–1, exhibit a ductility rating, in accordance with the aforementioned ASTM test D113–5, of only 40, as shown in Table II. However, when the copolymers of Example 1 and Example 2 were individually incorporated in this asphalt, a marked improvement in ductility was noted. Thus, the incorporation of 1 percent, by weight, of the copolymer of Example 1 in the asphalt, revealed an increased ductility rating of 56 cm.; incorporation of 2 percent, by weight, of the same copolymer in the asphalt, revealed a further increase in ductility of 104 cm.; and the incorporation of 2 percent, by weight, of the copolymer of Example 2 in the asphalt, revealed an increased ductility of 60 cm.

Although the present invention has been described with preferred embodiments, it will be understood that various modifications and adaptations thereof may be resorted to without departing from the spirit and scope of the invention, and that the asphaltic compositions herein described may also contain other additive materials intended to enhance the properties of such compositions in certain well-defined and specific aspects.

We claim:
1. An asphaltic composition containing, in an amount sufficient to improve the ductility of said composition, a polymeric material selected from the group consisting of copolymers of 1-olefins having from about 8 to about 24 carbon atoms and an alkyl maleate and an alkyl ester of a copolymer of said 1-olefin and maleic anhydride and wherein the alkyl portion of said maleate and said ester each contains from about 4 to about 24 carbon atoms.
2. A composition in accordance with claim 1 wherein the polymeric material comprises a styrene-alkyl maleate copolymer.
3. A composition in accordance with claim 1 wherein said polymeric material is present in an amount of at least 0.1 percent, by weight, of the total weight of said composition.
4. A composition in accordance with claim 1 wherein said polymeric material is present in an amount from about 0.1 percent to about 10 percent, by weight, of the total weight of said composition.
5. A composition in accordance with claim 1 wherein said polymeric material is present in an amount from about 1 percent to about 5 percent, by weight, of the total weight of said composition.

References Cited

UNITED STATES PATENTS

| | | | |
|---|---|---|---|
| 2,470,329 | 5/1949 | Barkhuff | 260—28.5 |
| 2,676,934 | 4/1954 | Butler | 260—28.5 |

MORRIS LIEBMAN, Primary Examiner

P. R. MICHL, Assistant Examiner

PO-1050
(5/69)

UNITED STATES PATENT OFFICE
CERTIFICATE OF CORRECTION

Patent No. 3,531,426      Dated September 29, 1970

Inventor(s) Joosup Shim and Paul Y. C. Gee

It is certified that error appears in the above-identified patent and that said Letters Patent are hereby corrected as shown below:

Column 4, line 38, for "at least 0.1" read --at least about 0.1--

SIGNED AND SEALED
NOV 24 1970

(SEAL)
Attest:

Edward M. Fletcher, Jr.
Attesting Officer

WILLIAM E. SCHUYLER, JR.
Commissioner of Patents